(12) United States Patent
Brannon et al.

(10) Patent No.: US 9,047,344 B2
(45) Date of Patent: Jun. 2, 2015

(54) GUARANTEEING DATA AND METADATA REFERENTIAL INTEGRITY IN CONTENT MANAGEMENT ARCHIVAL SOLUTIONS

(75) Inventors: Karen W. Brannon, Palo Alto, CA (US); Ying Chen, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1023 days.

(21) Appl. No.: 11/163,368

(22) Filed: Oct. 17, 2005

(65) Prior Publication Data

US 2007/0088754 A1 Apr. 19, 2007

(51) Int. Cl.
*G06F 17/30* (2006.01)

(52) U.S. Cl.
CPC ...... *G06F 17/3051* (2013.01); *G06F 17/30371* (2013.01); *G06F 17/30368* (2013.01)

(58) Field of Classification Search
CPC ................................................. G06F 17/30368
USPC ......... 707/202, 200, 203, 204, 682, 685, 686; 711/161, 162
See application file for complete search history.

(56) References Cited

U.S. PATENT DOCUMENTS

| | | | |
|---|---|---|---|
| 6,192,375 B1* | 2/2001 | Gross | 707/200 |
| 6,480,970 B1 | 11/2002 | DeKoning et al. | |
| 6,732,124 B1* | 5/2004 | Koseki et al. | 707/202 |
| 6,751,636 B1 | 6/2004 | Mende et al. | |
| 6,874,001 B2 | 3/2005 | Narang et al. | |
| 7,689,599 B1* | 3/2010 | Shah et al. | 714/19 |
| 2003/0069902 A1* | 4/2003 | Narang et al. | 707/203 |
| 2003/0197732 A1 | 10/2003 | Gupta | |
| 2004/0111390 A1 | 6/2004 | Saito et al. | |
| 2004/0122917 A1 | 6/2004 | Menon et al. | |
| 2004/0133589 A1 | 7/2004 | Kiessig et al. | |
| 2004/0193952 A1 | 9/2004 | Narayanan et al. | |
| 2004/0260900 A1 | 12/2004 | Burton et al. | |
| 2005/0010616 A1* | 1/2005 | Burks | 707/204 |
| 2005/0192991 A1* | 9/2005 | Nomoto et al. | 707/101 |
| 2005/0216653 A1* | 9/2005 | Aasheim et al. | 711/103 |
| 2006/0026634 A1* | 2/2006 | LaChapelle et al. | 725/34 |
| 2006/0117048 A1* | 6/2006 | Thind et al. | 707/101 |
| 2006/0190500 A1* | 8/2006 | Rao et al. | 707/203 |
| 2006/0224639 A1* | 10/2006 | Watanabe et al. | 707/201 |
| 2006/0282471 A1* | 12/2006 | Mark et al. | 707/200 |

OTHER PUBLICATIONS

Chiaffitelli et al.; Business Continuity and High Availability Tutorial for Spring SNW 2003; http://www.snwusa.com/presentations/; Apr. 2003.
Keeton et al.; Designing for Disasters; Proceedings of the Third USENIX Conference on File and Storage Technologies; FAST'04, San Francisco, CA, USA; Mar. 31, 2004.

* cited by examiner

*Primary Examiner* — Scott A Waldron
(74) *Attorney, Agent, or Firm* — IP Authority, LLC; Ramraj Soundararajan (57) ABSTRACT

Fast restoration of referential integrity between metadata and data after they were restored to some inconsistent backup copies in content management archival solutions. An inferred logging mechanism uses separate metadata and data logs to capture recent update activities during normal system conditions with additional object reference information using a method called reference tagging. This requires no system internal changes and introduces no performance overhead. The information in the logs facilitates quick identification of potential referential inconsistencies and allows referential integrity between metadata and data to be restored in a fraction of the time when compared to exhaustive data scans.

12 Claims, 4 Drawing Sheets

GUARANTEEING DATA AND METADATA REFERENTIAL INTEGRITY IN CONTENT MANAGEMENT ARCHIVAL SOLUTIONS

The present invention relates generally to the field of content management archival. More specifically, the present invention is related to the restoration of referential integrity between metadata and data.

DISCUSSION OF PRIOR ART

Content management archival solutions often contain a stack of loosely-coupled system components from different vendors. These system components create and manage interdependent metadata and data. However, the management activities such as backup and restore are carried out independently for metadata and data. As a result the metadata backup copies often do not match any data copies, and vise versa. There may be dangling or mismatched metadata and data (i.e., referential inconsistency).

Should such backup copies ever be needed, the restored inconsistent metadata and data copies may cause the overall system to malfunction and expose compliance risks. Existing solutions coping with such problems often rely on exhaustive scan of metadata and data and manual restoration of inconsistency, which is extremely expensive and sometimes impossible due to the large data size. See, for example "Business Continuity and High Availability Tutorial", Chiaffitelli, A. and Smith, W., Computerworld Storage Networking World (SNW), April 2003, or "Designing for Disasters", Keeton, K. Santos, C. Beyer, D. Chase, J. and Wilkes, J., Proceedings of the USENIX Conference on File and Storage Technologies (FAST), San Francisco, Calif., USA, March 2004.

Figure 1:
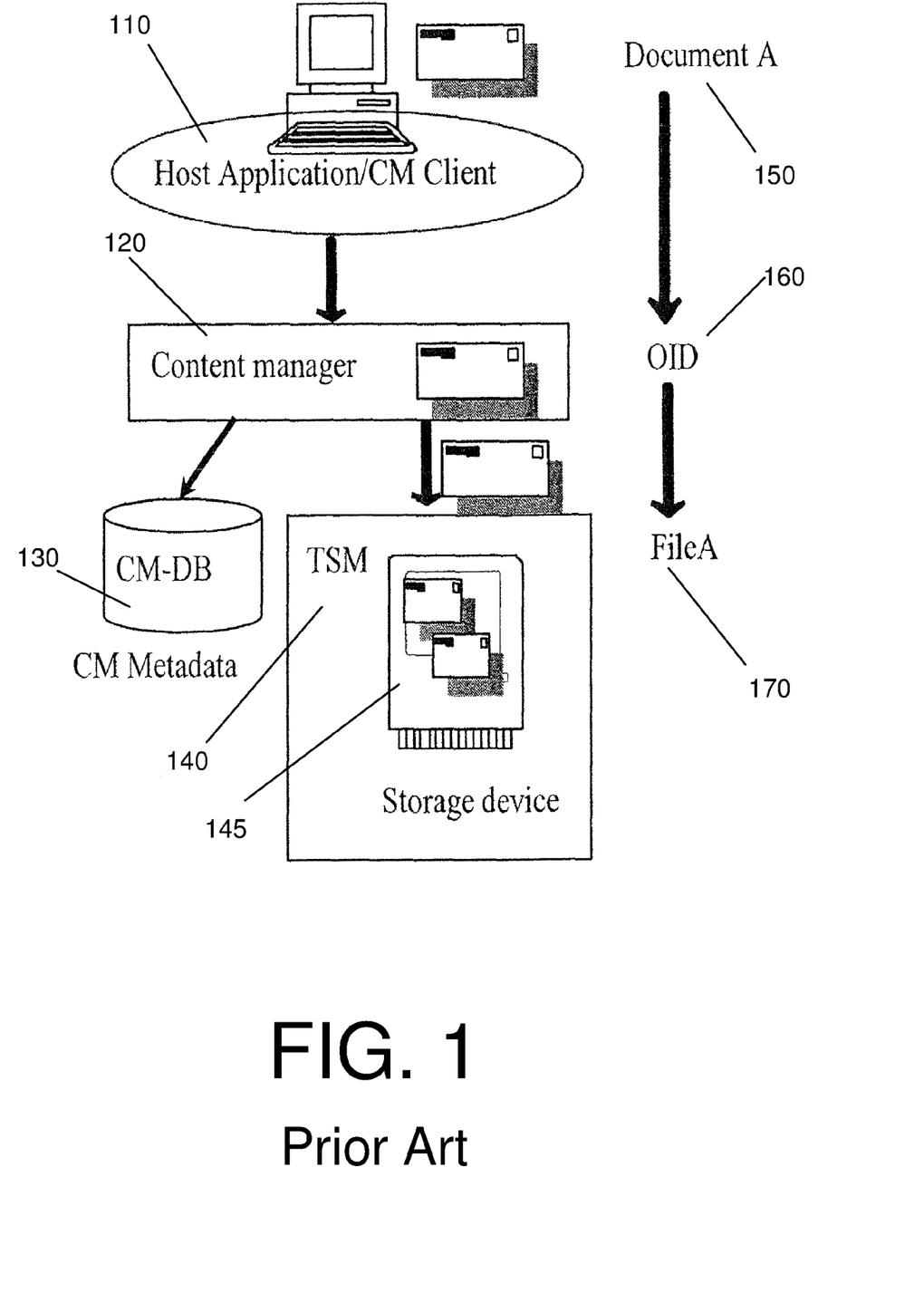
FIG. 1 illustrates an example of a content management archival solution architecture according to the prior art.

A typical Content Management Archival solution contains multiple system components from one or more vendors. FIG. 1 shows such an example which consists of IBM DB2 Content Manager (CM) and IBM Tivoli Storage Manager (TSM) 140 with an archival storage device 145. CM comprises the CM client 110 and the CM server 120. The CM client 110 interfaces with the user applications. CM generates and maintains metadata for each data object in its own RDBMS tables (CM-DB) 130. For instance, CM internally generates a unique OID (Object ID) 160 for each object (such as Document A 150) that the application stores through CM. The data objects such as emails and web pages are stored through TSM 140 which stores them to the underlying storage 145. CM internally maps OID 160 to a TSM file name (such as FileA 170). TSM 140 stores those data objects to storage 145, e.g., disks or tapes, or a WORM device. As applications store and retrieve data objects through such a hierarchy, a chain of object references is established at each system layer as seen in FIG. 1. Corruption of metadata will cause the loss of data accesses or metadata, as well as rendering data inconsistent.

Such an archival solution architecture is common in the state of the art. In such solutions, metadata and data objects may be controlled by CM and TSM respectively, or by any other proprietary software capable of doing so. Further, metadata and data management activities are typically done independently. That is, metadata and data objects may be backed up at different times. Any given backup copy of metadata may not match any data object backup copies or the most up-to-date copy, and vice versa for a data object copy. Restoring any one or more of such backup copies can cause inconsistencies that may lead to long running applications failures and data exposure to compliance risks, as indicated by some examples shown below, and yet administrators would have difficulty determining the root causes. Given the nature of the archival data, customers often prefer low-cost and efficient solutions that meet their minimal data protection requirements. Expensive backup schemes that keep metadata and data in sync at all times may not be necessary or preferable, while exhaustive data scans are unacceptable.

In particular, if metadata or data, or both are restored to backup copies after failure, the restored metadata and data copies will have three types of referential inconsistencies.

Firstly, dangling data objects: Data objects stored in the data archival storage that do not have corresponding metadata records in the metadata databases. For instance, if the data objects stored in the data archival storage are newer than the metadata, some newly created data objects may not be found in the latest backup copy of the metadata.

Secondly, dangling metadata records: Metadata records that do not have corresponding data objects stored in the data storage.

Thirdly, mismatched data and metadata: This may happen if the metadata records contain information that depends on the content of the data objects. For instance, if the data object's checksums are stored in the metadata database, the stored checksum may not match the data object content if the data object copy was either newer or older than the restored checksum.

In the case of a regulatory compliant archival solution, it is not uncommon for the retention information to be stored both in the metadata database and in the storage. The retention information in the metadata database is used for retention management purposes. In the storage, it is used to enforce data retention. Such retention information may become inconsistent after metadata restores. Leaving dangling data or metadata around in the system in an unknown fashion is risky for discovery and litigation reasons especially in light of the recent requirements of regulations such as Sarbanes-Oxley and HIPAA. Mismatched data and metadata can cause system failure. At the same time, administrators have no way to reason how and when such mismatch occurred.

Whatever the precise merits, features, and advantages of the above cited references, none of them achieves or fulfills the purposes of the present invention.

SUMMARY OF THE INVENTION

The present invention provides fast restoration of referential integrity between metadata and data after they have been restored to inconsistent backup copies in content management archival solutions. An inferred logging mechanism according to the invention uses separate metadata and data logs to capture recent update activities during normal system conditions with additional object reference information using a method called reference tagging. This requires no system internal changes and introduces no performance overhead. The information in the logs facilitates quick identification of potential referential inconsistencies and allows referential integrity between metadata and data to be restored in a fraction of the time when compared to exhaustive data scans.

In a first aspect of the invention, a method is provided to restore referential integrity between data and associated metadata in content management archival in a case of failure of said metadata, including the steps of logging changes in the data in a data update log, restoring the metadata from an archive, checking for an inconsistency between the metadata and the changes in the data, and restoring referential integrity between the data and the metadata.

In a second aspect of the invention, a method is provided to restore referential integrity between data and associated metadata in content management archival in a case of failure of said metadata, including the steps of logging changes in the data in a data update log, restoring the metadata from an archive, checking for an inconsistency between the metadata and the changes in the data, and restoring referential integrity between the data and the metadata, where the step of checking for the inconsistency between the metadata and the changes in the data includes checking only changes in the data occurring after a time of generating the archive.

In a third aspect of the invention, a method is provided to restore referential integrity between data and associated metadata in content management archival in a case of failure of said metadata, including the steps of logging changes in the data in a data update log, restoring the metadata from an archive, checking for an inconsistency between the metadata and the changes in the data, and restoring referential integrity between the data and the metadata, further including the step of tagging the changes in the data with object names.

In a fourth aspect of the invention, a method is provided to restore referential integrity between data and associated metadata in content management archival in a case of failure of said metadata, including the steps of logging changes in the data in a data update log, restoring the metadata from an archive, checking for an inconsistency between the metadata and the changes in the data, and restoring referential integrity between the data and the metadata, including the step of tagging the changes in the data with object names and further including the step of retrieving an object name corresponding to the inconsistency.

In a fifth aspect of the invention, a method is provided to restore referential integrity between data and associated metadata in content management archival in a case of failure of said metadata, including the steps of logging changes in the data in a data update log, restoring the metadata from an archive, checking for an inconsistency between the metadata and the changes in the data, and restoring referential integrity between the data and the metadata, including the step of tagging the changes in the data with object names and further including the step of retrieving an object name corresponding to the inconsistency, where the object name is retrieved from the data update log.

In a sixth aspect of the invention, a method is provided to restore referential integrity between data and associated metadata in content management archival in a case of failure of said metadata, including the steps of logging changes in the data in a data update log, restoring the metadata from an archive, checking for an inconsistency between the metadata and the changes in the data, and restoring referential integrity between the data and the metadata, further including the step of storing the data update log in a same storage device as the data.

In a seventh aspect of the invention, a method is provided to restore referential integrity between data and associated metadata in content management archival in a case of failure of said metadata, including the steps of logging changes in the data in a data update log, restoring the metadata from an archive, checking for an inconsistency between the metadata and the changes in the data, and restoring referential integrity between the data and the metadata, further including the step of notifying a user of the inconsistency between the metadata and the data.

In an eighth aspect of the invention, a method is provided to restore referential integrity between data and associated metadata in content management archival in a case of failure of said metadata, including the steps of logging changes in the data in a data update log, restoring the metadata from an archive, checking for an inconsistency between the metadata and the changes in the data, and restoring referential integrity between the data and the metadata, further including the step of clearing the inconsistency between the metadata and the data.

In a ninth aspect of the invention, a method is provided to restore referential integrity between data and associated metadata in content management archival in a case of failure of the data, including the steps of logging changes in the metadata in a metadata update log, restoring the data from an archive, checking for an inconsistency between the data and the changes in the metadata, and restoring referential integrity between the data and the metadata.

In a tenth aspect of the invention, a method is provided to restore referential integrity between data and associated metadata in content management archival in a case of failure of the data, including the steps of logging changes in the metadata in a metadata update log, restoring the data from an archive, checking for an inconsistency between the data and the changes in the metadata, and restoring referential integrity between the data and the metadata, where the step of checking for the inconsistency between the data and the changes in the metadata includes checking only changes in the metadata occurring after a time of generating the archive.

In a eleventh aspect of the invention, a method is provided to restore referential integrity between data and associated metadata in content management archival in a case of failure of the data, including the steps of logging changes in the metadata in a metadata update log, restoring the data from an archive, checking for an inconsistency between the data and the changes in the metadata, and restoring referential integrity between the data and the metadata, where the step of logging changes in the metadata employs an existing transaction log provided as part of a relational database management system as the metadata update log.

In a twelfth aspect of the invention, a method is provided to restore referential integrity between data and associated metadata in content management archival in a case of failure of the data, including the steps of logging changes in the metadata in a metadata update log, restoring the data from an archive, checking for an inconsistency between the data and the changes in the metadata, and restoring referential integrity between the data and the metadata, further including storing the metadata update log in a same storage device as the metadata.

In a thirteenth aspect of the invention, a method is provided to restore referential integrity between data and associated metadata in content management archival in a case of failure of the data, including the steps of logging changes in the metadata in a metadata update log, restoring the data from an archive, checking for an inconsistency between the data and the changes in the metadata, and restoring referential integrity between the data and the metadata, further including the step of notifying a user of the inconsistency between the metadata and the data.

In a fourteenth aspect of the invention, a method is provided to restore referential integrity between data and associated metadata in content management archival in a case of failure of the data, including the steps of logging changes in the metadata in a metadata update log, restoring the data from an archive, checking for an inconsistency between the data and the changes in the metadata, and restoring referential integrity between the data and the metadata, further including the step of clearing the inconsistency between the metadata and the data.

In a fifteenth aspect of the invention, a system is provided to guarantee referential integrity between data and metadata, including a data update log, a metadata update log, and an inference engine that infers corresponding updates between the data and the metadata to identify a subset of the data and the metadata to be checked for an inconsistency in a case of failure of the data or the metadata.

In a sixteenth aspect of the invention, a system is provided to guarantee referential integrity between data and metadata, including a data update log, a metadata update log, and an inference engine that infers corresponding updates between the data and the metadata to identify a subset of the data and the metadata to be checked for an inconsistency in a case of failure of the data or the metadata, where the data update log and the metadata update log are stored separately from each other.

In a seventeenth aspect of the invention, a system is provided to guarantee referential integrity between data and metadata, including a data update log, a metadata update log, and an inference engine that infers corresponding updates between the data and the metadata to identify a subset of the data and the metadata to be checked for an inconsistency in a case of failure of the data or the metadata, where the data update log and the metadata update log are stored separately from each other, further including a storage manager, and a data storage device connected to the storage manager and storing the data, where the data update log is stored in the data storage device.

In a eighteenth aspect of the invention, a system is provided to guarantee referential integrity between data and metadata, including a data update log, a metadata update log, and an inference engine that infers corresponding updates between the data and the metadata to identify a subset of the data and the metadata to be checked for an inconsistency in a case of failure of the data or the metadata, where the data update log and the metadata update log are stored separately from each other, further including a storage manager, and a data storage device connected to the storage manager and storing the data, where the data update log is stored in the data storage device, further including a storage manager logger installed in the storage manager and configured to extract the object names from the data update log.

In a nineteenth aspect of the invention, a system is provided to guarantee referential integrity between data and metadata, including a data update log, a metadata update log, and an inference engine that infers corresponding updates between the data and the metadata to identify a subset of the data and the metadata to be checked for an inconsistency in a case of failure of the data or the metadata, where the data update log and the metadata update log are stored separately from each other, further including a content manager, and a metadata storage device connected to the content manager and storing the metadata in a content management database, where the metadata update log is stored in the metadata storage device.

In a twentieth aspect of the invention, a system is provided to guarantee referential integrity between data and metadata, including a data update log, a metadata update log, and an inference engine that infers corresponding updates between the data and the metadata to identify a subset of the data and the metadata to be checked for an inconsistency in a case of failure of the data or the metadata, where the data update log and the metadata update log are stored separately from each other, further including a content manager, and a metadata storage device connected to the content manager and storing the metadata in a content management database, where the metadata update log is stored in the metadata storage device, further including an intercept module installed in the content manager and configured to tag records in the data update log with object names.

In a twenty-first aspect of the invention, a system is provided to guarantee referential integrity between data and metadata, including a data update log, a metadata update log, and an inference engine that infers corresponding updates between the data and the metadata to identify a subset of the data and the metadata to be checked for an inconsistency in a case of failure of the data or the metadata, where the data update log and the metadata update log are stored separately from each other, further including a content manager, and a metadata storage device connected to the content manager and storing the metadata in a content management database, where the metadata update log is stored in the metadata storage device, further including an intercept module installed in the content manager and configured to tag records in the data update log with object names, where the content manager includes a client and a server configured to be interconnected, and the intercept module is installed in the client.

In a twenty-second aspect of the invention, a system is provided to guarantee referential integrity between data and metadata, including a data update log, a metadata update log, and an inference engine that infers corresponding updates between the data and the metadata to identify a subset of the data and the metadata to be checked for an inconsistency in a case of failure of the data or the metadata, further including reference tags noting metadata updates seen by a data storage and data updates seen by a metadata storage, where the inference engine infers the corresponding updates based on the reference tags.

In a twenty-third aspect of the invention, a computer readable medium is provided having computer executable instructions for performing steps to restore referential integrity between data and associated metadata in content management archival, including computer readable program code logging changes in the data in a data update log, computer readable program code logging changes in the metadata in a metadata update log, computer readable program code restoring information from an archive, the information selected from a group consisting of the data and the metadata, computer readable program code checking for an inconsistency, where, if the information is the metadata, the inconsistency is checked for between the metadata and the changes in the data, and if the information is the data, the inconsistency is checked for between the data and the changes in the metadata, and computer readable program code restoring referential integrity between the data and the metadata.

In a twenty-fourth aspect of the invention, a computer readable medium is provided having computer executable instructions for performing steps to restore referential integrity between data and associated metadata in content management archival, including computer readable program code logging changes in the data in a data update log, computer readable program code logging changes in the metadata in a metadata update log, computer readable program code restoring information from an archive, the information selected from a group consisting of the data and the metadata, computer readable program code checking for an inconsistency, where, if the information is the metadata, the inconsistency is checked for between the metadata and the changes in the data, and if the information is the data, the inconsistency is checked for between the data and the changes in the metadata, and computer readable program code restoring referential integrity between the data and the metadata, where the computer readable program code for checking the inconsistency checks only changes occurring after a time of generating the archive.

In a twenty-fifth aspect of the invention, a computer readable medium is provided having computer executable instructions for performing steps to restore referential integrity between data and associated metadata in content management archival, including computer readable program code logging changes in the data in a data update log, computer readable program code logging changes in the metadata in a metadata update log, computer readable program code restoring information from an archive, the information selected from a group consisting of the data and the metadata, computer readable program code checking for an inconsistency, where, if the information is the metadata, the inconsistency is checked for between the metadata and the changes in the data, and if the information is the data, the inconsistency is checked for between the data and the changes in the metadata, and computer readable program code restoring referential integrity between the data and the metadata, further including computer readable program code tagging the changes in the data with object names.

In a twenty-sixth aspect of the invention, a computer readable medium is provided having computer executable instructions for performing steps to restore referential integrity between data and associated metadata in content management archival, including computer readable program code logging changes in the data in a data update log, computer readable program code logging changes in the metadata in a metadata update log, computer readable program code restoring information from an archive, the information selected from a group consisting of the data and the metadata, computer readable program code checking for an inconsistency, where, if the information is the metadata, the inconsistency is checked for between the metadata and the changes in the data, and if the information is the data, the inconsistency is checked for between the data and the changes in the metadata, and computer readable program code restoring referential integrity between the data and the metadata, including computer readable program code tagging the changes in the data with object names, and further including computer readable program code retrieving at least one of the object names corresponding to the inconsistency.

In a twenty-seventh aspect of the invention, a computer readable medium is provided having computer executable instructions for performing steps to restore referential integrity between data and associated metadata in content management archival, including computer readable program code logging changes in the data in a data update log, computer readable program code logging changes in the metadata in a metadata update log, computer readable program code restoring information from an archive, the information selected from a group consisting of the data and the metadata, computer readable program code checking for an inconsistency, where, if the information is the metadata, the inconsistency is checked for between the metadata and the changes in the data, and if the information is the data, the inconsistency is checked for between the data and the changes in the metadata, and computer readable program code restoring referential integrity between the data and the metadata, including computer readable program code tagging the changes in the data with object names, and further including computer readable program code retrieving at least one of the object names corresponding to the inconsistency, where the at least one of the object names is retrieved from the data update log.

In a twenty-eighth aspect of the invention, a computer readable medium is provided having computer executable instructions for performing steps to restore referential integrity between data and associated metadata in content management archival, including computer readable program code logging changes in the data in a data update log, computer readable program code logging changes in the metadata in a metadata update log, computer readable program code restoring information from an archive, the information selected from a group consisting of the data and the metadata, computer readable program code checking for an inconsistency, where, if the information is the metadata, the inconsistency is checked for between the metadata and the changes in the data, and if the information is the data, the inconsistency is checked for between the data and the changes in the metadata, and computer readable program code restoring referential integrity between the data and the metadata, where the data update log is stored separately from the metadata update log, the data update log is stored separately from the metadata, and the metadata update log is stored separately from the data.

In a twenty-ninth aspect of the invention, a computer readable medium is provided having computer executable instructions for performing steps to restore referential integrity between data and associated metadata in content management archival, including computer readable program code logging changes in the data in a data update log, computer readable program code logging changes in the metadata in a metadata update log, computer readable program code restoring information from an archive, the information selected from a group consisting of the data and the metadata, computer readable program code checking for an inconsistency, where, if the information is the metadata, the inconsistency is checked for between the metadata and the changes in the data, and if the information is the data, the inconsistency is checked for between the data and the changes in the metadata, and computer readable program code restoring referential integrity between the data and the metadata, further including computer readable program code notifying a user of the inconsistency between the metadata and the data.

In a thirtieth aspect of the invention, a computer readable medium is provided having computer executable instructions for performing steps to restore referential integrity between data and associated metadata in content management archival, including computer readable program code logging changes in the data in a data update log, computer readable program code logging changes in the metadata in a metadata update log, computer readable program code restoring information from an archive, the information selected from a group consisting of the data and the metadata, computer readable program code checking for an inconsistency, where, if the information is the metadata, the inconsistency is checked for between the metadata and the changes in the data, and if the information is the data, the inconsistency is checked for between the data and the changes in the metadata, and computer readable program code restoring referential integrity between the data and the metadata, further including computer readable program code clearing the inconsistency between the metadata and the data.

DESCRIPTION OF THE PREFERRED EMBODIMENTS

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

novel scheme is presented that uses existing backup schemes as is, while avoiding exhaustive data scans. The data set to be checked is narrowed to a very small size in order to restore referential integrity between metadata and data; hence the consistency restoration time is significantly reduced. The method does not intend to bring the metadata and data to a state as if they were precisely synchronized at a particular point in time, since that would require more expensive and complicated schemes which may not be appealing to users. Instead, this method guarantees metadata and data referential integrity. Such guarantees are sufficient to allow the overall system to function correctly and efficiently without exposing unknown compliance risks.

The present invention assumes that after failures in metadata, data, or both have occurred, they are restored to recent respective backup copies, which may have referential inconsistency. To quickly restore metadata and data referential integrity after such situations, one way is to have a mechanism to narrow down the set of metadata or data records to be checked for potential inconsistency to a relatively small set. Using the example shown in FIG. 1, suppose that there were a CM failure and CM-DB 130 was restored to a backup copy taken at time T, and all TSM's data objects were still up-to-date. Note that the referential inconsistencies between metadata and data can only be caused by those updates that were made to the system after time T. As long as it is known what those updates were, those updated data can simply be checked and referential integrity restored accordingly. In general, in a system with n metadata components and m data components, which are restored to their own respective backup copies at $T_1, T_2, \ldots T_n, \ldots, T_{n+m}$, then the potential inconsistencies must come from the updates that were made between $\min(T_1, T_2, \ldots, T_{n+m})$ and $\max(T_1, T_2, \ldots, T_{n+m})$. This suggests that if we have a way to keep track of such updates and extract them after the metadata and data components were restored to backup copies, their potential inconsistencies can easily be resolved.

The above observations led to the inferred logging scheme of the present invention, enabling fast consistency restoration. This scheme includes a tracking mechanism that logs the recent updates seen by each of the data and metadata components in persistent storage spaces (called update logs). These update logs must have a set of specific properties in order for the overall scheme to work in practice.

Firstly, the update logs must be long enough to capture a sufficient number of updates for referential consistency checks. In practice, users will typically restore data to its latest backup copy. As long as the logs contain all updates that have happened since the time when that backup copy was taken, the logs are valid for use. Customers commonly make daily backups, and the daily total archival data size is typically a few gigabytes (GBs), or a few tens of GBs. So the log size need not be very big (the logs do not log data content itself, only an indication of which object is changed is logged).

Secondly, the update logs should not be stored on the same storage devices as the respective metadata and data components they are to be compared with, to avoid the loss of data or metadata and update logs at the same time, hence making subsequent referential integrity checks impossible.

Note also that the only application updates that can result in referential inconsistency must be amongst those that require updates to both metadata and data in the same call. That is to say, they must be amongst those where there is a relationship established in that call. Other updates that are made to metadata or data alone, but not to both, will not cause referential inconsistency, since no relationships are established between the two. This suggests that by tracking each data object update seen by the data archival storage, it can be inferred that there may be a corresponding metadata update associated with that data object update, hence the name inferred logging. If the metadata fails and is restored to an old copy, the tracked data object updates alone ought to be sufficient, as they should contain any updates that might have caused referential inconsistency between metadata and data. The converse is true for tracking metadata updates in order to cope with data object failures. In the example above, to restore referential consistency after CM-DB 130 has been restored to a backup copy taken at time T, only those updates that were seen by TSM 140 after time T need be examined.

This means that separate update logs can be kept for metadata and data. Metadata update logs can be used to deal with data object failures, and data object update logs to deal with metadata failures. This also makes it extremely convenient to meet the second property of the update logs. As the metadata and data are often stored on separate storage devices that have different failure characteristics, the metadata update logs can be kept on the same storage devices as the metadata itself. Hence failures in data storage would not cause the loss of the metadata log. The converse is true for the data update logs, i.e. the data update logs can be kept on the same storage devices as the data.

Figure 2:
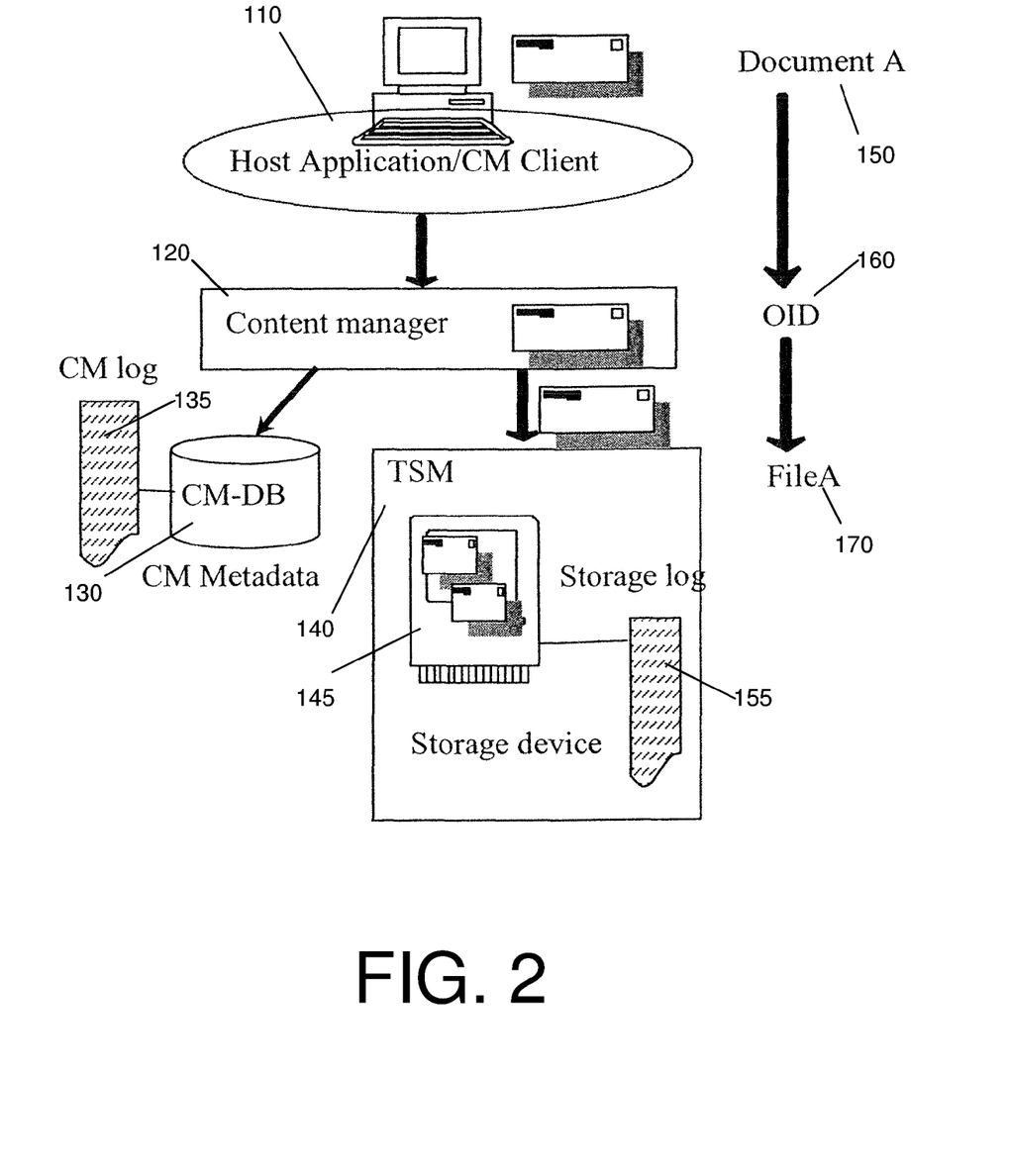
FIG. 2 illustrates logging updates in a content management archival system for restoration of metadata and data referential integrity according to the present invention.

Another convenience is that for metadata, since there is already a transaction log in RDBMS, there is no need to create a separate metadata update log. The transaction log is sufficient for this purpose as long as it is configured to be long enough. The data archival storage will maintain its own update log. FIG. 2 shows such logs in each of the system components, i.e. CM log 135 in CM-DB 130 and storage log 155 in storage device 145.

Figure 3:
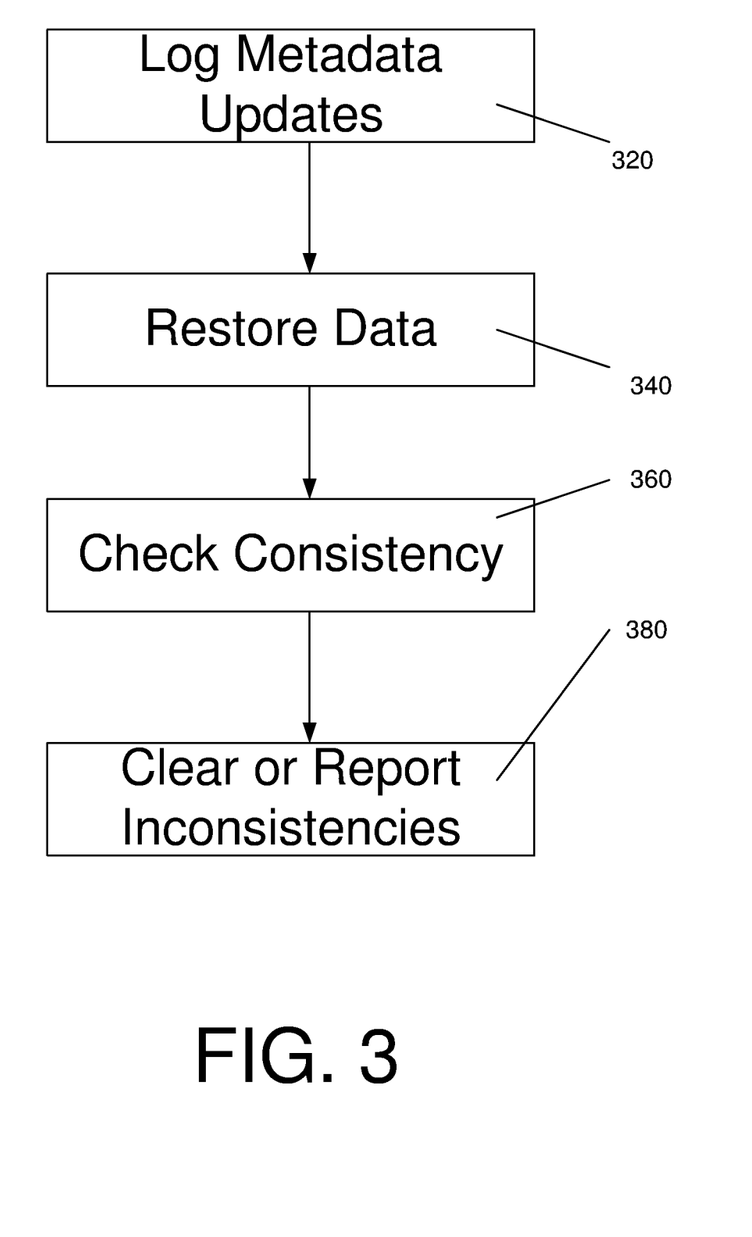
FIG. 3 is a flow chart showing restoration of metadata and data referential integrity in a case where metadata is to be restored from an archive.

FIG. 3 illustrates a broad outline of the process for restoring integrity in the case of data failure. Metadata updates are previously logged in step 320 before a backup of the data is restored in step 340. The metadata update log and the restored data are then compared in step 360, and in step 380 any inconsistencies between the two are either cleared and/or reported to the user.

Such a logging scheme has an additional advantage: this allows the system to backup update logs as if they were part of data or metadata respectively. This is important since in case of failures in both metadata and data failures, both metadata and data may be restored to respective old backup copies. If the backup copies contain update logs and the update logs contain sufficient information, they can be used to speed up referential integrity checks. Otherwise, a full data scan would be needed.

Providing update logs alone is not sufficient to cope with metadata failures. This is because data object update logs may not contain sufficient information for fast referential integrity restoration. For instance, if the logged records in the data storage archival only contain TSM file names, to check if there is a matching metadata record in CM-DB, there must be a reverse mapping structure that maps a given TSM filename to an object name. Otherwise, scanning the entire CM-DB tables might be necessary. Yet, such reverse mapping structures are often not readily available. In the present invention, reference tagging is employed to address this problem. Note that this problem does not exist for data object failures. This is because the metadata update log records contain information such as object name or OID. To find the data object associated with a given OID or object name is trivial since the metadata component internally already has such forward mapping structures built in for normal data access purposes.

Figure 4:
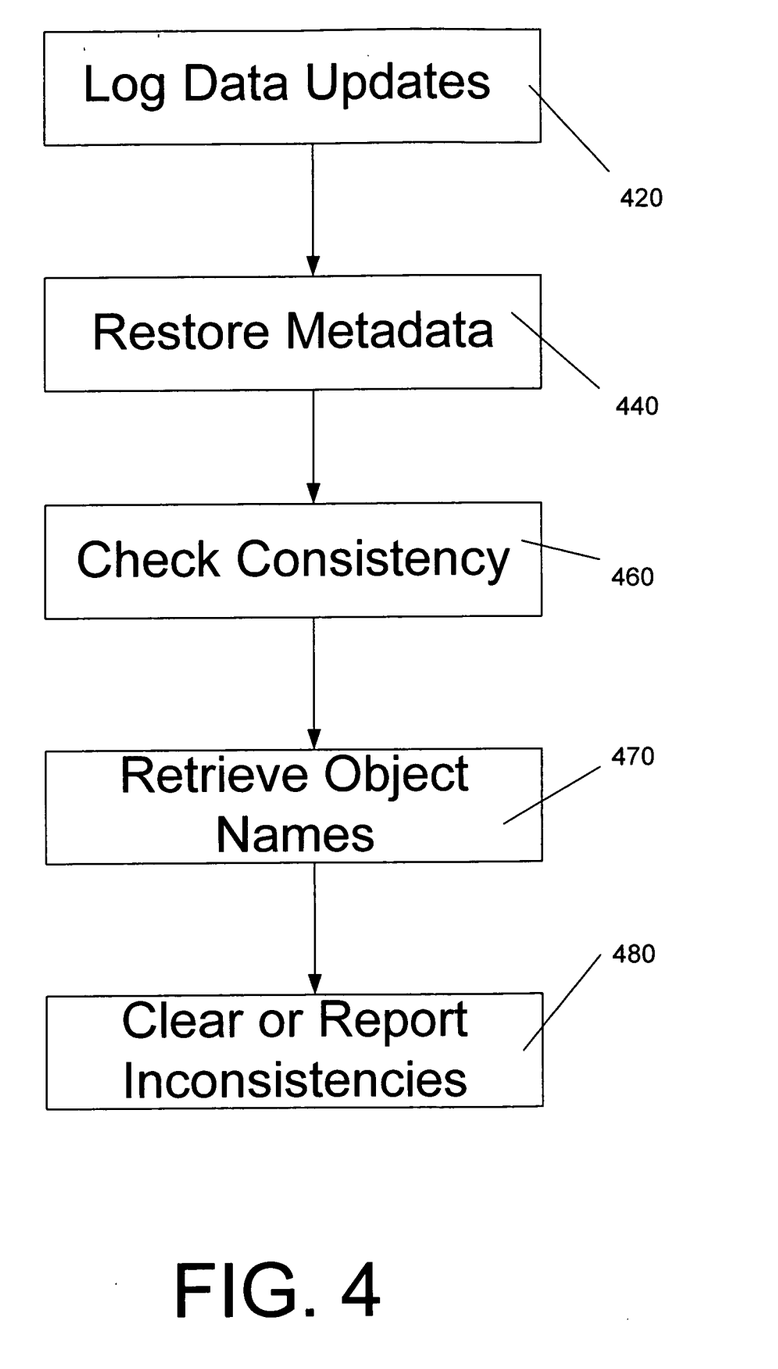
FIG. 4 is a flow chart showing restoration of metadata and data referential integrity in a case where data is to be restored from an archive.

FIG. 4 represents the process for restoring integrity between data and metadata when it is the metadata that has failed and has to be restored. Data updates are previously logged in step 420 before a backup of the metadata is restored in step 440. The data update log and the restored metadata are then compared in step 460, and in step 470 the object name or OID of a changed data object is retrieved. In step 480 any inconsistencies between the data update log and the restored metadata are either cleared and/or reported to the user. Note that step 470 is an additional step that has no equivalent in FIG. 3.

Note that in the TSM update log 155, if each update log record contains both the original object name and the TSM filename, during the referential integrity restoration phase, one can use the original object name to search the CM-DB 130 easily, since CM typically has indexes built with such names as search keys for normal data accesses. This implies that as long as a way can be found to pass such object name reference to TSM for each TSM update request, TSM's logger can extract such information and log it accordingly. Passing such additional reference information is trivial if there is already such interface support across system layers. Without a proper interface support, different methods must be used.

With reference tagging, since the CM client 110 knows about the object name, CM client 110 can tag the object name as part of the data object in a special format, such as: <length of the object name, object name, actual data object content>. As the object is passed to TSM 140, the TSM logger is the first to see such data. The object name can be extracted as well as other information to form the update log record, and then only the actual data object sent to the underlying storage 145. This way, there are no system internal changes needed in CM or TSM. Only a CM Client intercept module and the TSM logger need be added, which intercept data object updates and rewrite them by tagging and extracting object name reference information respectively. Such modules use existing system APIs without system internal changes. Only installation of the intercept module and the data object logger is needed.

With inferred logging, one can easily identify referentially inconsistent metadata and data and restore the referential integrity as needed. A tool can be developed to achieve the task. Dangling data or metadata can be either cleared automatically or reported to users. Similarly the mismatch data and metadata can be corrected or reported. The reported information must use high level object references such as the original object names for users to make use of them. Since reference tagging is employed, such high level object references are available. Sometimes, reporting inconsistencies to users allows them to recover the lost data, if the lost data is still available. For instance, the lost objects may still be found in the client's TrashCan or RecycleBin. Users could copy data out of the TrashCan as a way to recover the lost data if they knew what data was lost. Such recovery procedures can be further automated for popular applications to avoid human intervention. When the Recycle Bin or Trash Can does not have the target data object, users may choose to reenter the lost information. As long as such incidents are rare, such human intervention may still be much cheaper and more effective than maintaining a remote site at all times or asking users to blindly reenter the entire day or week of work.

In summary, a novel inferred logging mechanism for fast restoration of referential integrity after metadata or data failures has been presented. The solution is low cost and efficient. It introduces no performance impact for normal system conditions. The mechanism is applicable to any separately managed metadata and data storage systems with no system internal changes, hence making it easy to incorporate it into any other content management archival solutions.

Additionally, the present invention provides for an article of manufacture comprising computer readable program code contained within implementing one or more modules to restore referential integrity between metadata and data. Furthermore, the present invention includes a computer program code-based product, which is a storage medium having program code stored therein which can be used to instruct a computer to perform any of the methods associated with the present invention. The computer storage medium includes any of, but is not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, or any other appropriate static or dynamic memory or data storage devices.

Implemented in computer program code based products are software modules for: (a) logging data object updates; (b) tagging data object updates with object names or OIDs; and (c) restoring referential integrity.

Conclusion

A system and method has been shown in the above embodiments for the effective implementation of a method to guarantee data and metadata referential integrity in content management archival solutions. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware.

The above enhancements are implemented in various computing environments. For example, the present invention may be implemented on a conventional IBM PC or equivalent, multi-nodal system (e.g., LAN) or networking system (e.g., Internet, WWW, wireless web). All programming and data related thereto are stored in computer memory, static or dynamic, and may be retrieved by the user in any of: conventional computer storage, display (i.e., CRT) and/or hardcopy (i.e., printed) formats. The programming of the present invention may be implemented by one of skill in the art of data archival programming.

What is claimed is:

1. A method comprising:
   maintaining a metadata update log and a separate data object update log, said metadata update log maintained on a different storage device than that of said data object update log;
   upon a data object failure, examining said metadata update log, or upon a metadata failure, examining said data object update log, and identifying only data operations performed between a last backup and just prior to either of said data object failure or said metadata failure by examining either said metadata update log for said data object failure or examining said data object update log for said metadata failure;

identifying, from said identified data operations, a subset of data objects and a subset of metadata with one or more referential inconsistencies, said referential inconsistencies comprising data objects not having corresponding metadata, metadata not having corresponding data objects and mismatched data objects and metadata;

restoring referential integrity only between said subset of data objects and said subset of metadata;

reducing restoration time by narrowing data objects and metadata to be checked to only said subset of metadata, and where said data object update log is used to deal with metadata failures and said metadata update log that is maintained on said different storage device than that of said data object update log is used to deal with data object failures.

2. The method according to claim 1, further comprising the step of: tagging said identified data operations in said data objects with object names.

3. The method according to claim 2, further comprising the step of:
   retrieving at least one of said object names corresponding to said one or more referential inconsistencies.

4. The method according to claim 3, wherein: said at least one of said object names is retrieved from said data object update log.

5. The method according to claim 1, further comprising the step of:
   notifying a user of said one or more referential inconsistencies.

6. The method according to claim 1, further comprising the step of:
   automatically clearing said one or more referential inconsistencies.

7. A computer-based system to guarantee referential integrity between data objects and metadata, comprising:
   computer storage having non-transitory computer readable program code implementing:
      a data object update log;
      a metadata update log maintained on a different storage device than that of said data object update log; and
      an inference engine:
         upon a data object failure, examining said metadata update log, or upon a metadata failure, examining said data object update log, and identifying only data operations performed between a last backup and just prior to either of said data object failure or said metadata failure by examining either said metadata update log for said data object failure or examining said data object update log for said metadata failure;
         identifying, from said identified data operations, a subset of data objects and a subset of metadata with one or more referential inconsistencies, said referential inconsistencies comprising data objects not having corresponding metadata, metadata not having corresponding data objects and mismatched data objects and metadata;
   a hardware processor executing said computer readable program code to restore referential integrity only between said subset of data objects and said subset of metadata and to reduce restoration time by narrowing data objects and metadata to be checked to only said subset of metadata, and where said data object update log is used to deal with metadata failures and said metadata update log that is maintained on said different storage device than that of said data object update log is used to deal with data object failures.

8. The computer-based system according to claim 7, further comprising:
   a content manager; and
   a metadata storage device connected to said content manager and storing said metadata in a content management database; wherein: said metadata update log is stored in said metadata storage device.

9. The computer-based system according to claim 8, further comprising:
   an intercept module installed in said content manager and tags said identified data operations in said data object update log with object names.

10. The computer-based system according to claim 9, wherein:
    said content manager comprises a client and a server that are interconnected; and
    said intercept module is installed in said client.

11. The computer-based system according to claim 7, further comprising:
    reference tags noting metadata updates seen by a data object storage device and data object updates seen by a metadata storage device, wherein:
    said inference engine infers said metadata updates and data object updates based on said reference tags.

12. A non-transitory computer storage medium storing computer executable instructions for performing steps to restore referential integrity between data and associated metadata in content management archival, comprising:
   computer readable program code maintaining a metadata update log and a separate data object update log, said metadata update log maintained on a different storage device than that of said data object update log,
   upon a data object failure, examining said metadata update log, or upon a metadata failure, examining said data object update log, and identifying only data operations performed between a last backup and just prior to either of said data object failure or said metadata failure by examining either said metadata update log for said data object failure or examining said data object update log for said metadata failure;
   computer readable program code identifying, from said identified data operations, a subset of data objects and a subset of metadata with one or more referential inconsistencies, said referential inconsistencies comprising data objects not having corresponding metadata, metadata not having corresponding data objects, and mismatched data objects and metadata;
   computer readable program code restoring referential integrity only between said subset of data objects and said subset of metadata;
   computer readable program code reducing restoration time by narrowing data objects and metadata to be checked to only said subset of metadata, and
   where said data object update log is used to deal with metadata failures and said metadata update log that is maintained on said different storage device than that of said data object update log is used to deal with data object failures.

* * * * *